(12) United States Patent
Nakamura et al.

(10) Patent No.: US 10,793,206 B2
(45) Date of Patent: Oct. 6, 2020

(54) VEHICLE HAVING COOLING DEVICE

(71) Applicant: Toyota Jidosha Kabushiki Kaisha, Toyota-shi Aichi-ken (JP)

(72) Inventors: Koichi Nakamura, Miyoshi (JP); Tomoaki Furukawa, Toyota (JP); Kiyonori Takagi, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 135 days.

(21) Appl. No.: 16/264,002

(22) Filed: Jan. 31, 2019

(65) Prior Publication Data

US 2019/0233026 A1 Aug. 1, 2019

(30) Foreign Application Priority Data

Feb. 1, 2018 (JP) .................. 2018-016802

(51) Int. Cl.
| | |
|---|---|
| *B60J 9/00* | (2006.01) |
| *B62D 35/02* | (2006.01) |
| *B62D 25/24* | (2006.01) |
| *B60K 11/08* | (2006.01) |
| *B60K 13/02* | (2006.01) |
| *B60K 11/02* | (2006.01) |

(Continued)

(52) U.S. Cl.
CPC ............ *B62D 35/02* (2013.01); *B60K 11/02* (2013.01); *B60K 11/04* (2013.01); *B60K 11/06* (2013.01); *B60K 11/08* (2013.01); *B60K 13/02* (2013.01); *B60K 13/04* (2013.01); *B62D 25/24* (2013.01); *B60K 1/00* (2013.01); *B60K 2001/001* (2013.01); *B60K 2001/006* (2013.01)

(58) Field of Classification Search
CPC ......... C04B 7/43; C04B 7/432; Y02T 10/146; B60K 11/04; B60K 13/02; F01P 11/10; A45C 11/20; F04C 23/00; F22B 1/1846; Y10S 297/01
See application file for complete search history.

(56) References Cited

U.S. PATENT DOCUMENTS

| | | | | |
|---|---|---|---|---|
| 2,100,490 A | * | 11/1937 | Rippingille | ............ B60K 11/04 180/68.1 |
| 6,354,003 B1 | * | 3/2002 | Lehmann | ................ B29C 44/12 29/460 |

(Continued)

FOREIGN PATENT DOCUMENTS

| | | |
|---|---|---|
| JP | 2006103365 A | 4/2006 |
| JP | 2017094771 A | 6/2017 |

*Primary Examiner* — Kiran B Patel
(74) *Attorney, Agent, or Firm* — Dinsmore & Shohl LLP

(57) ABSTRACT

A vehicle includes a heat exchanging type cooling device includes an undercover disposed below the cooler body and having an air exhaust passage into which the ambient air discharged through the lower surface of the cooler body is introduced and through which the ambient air is exhausted into outside atmosphere, under a negative air pressure generated due to an air stream generated during running of the vehicle; and an elastically deformable sealing member in a closed form interposed between the air exhaust passage and the lower surface of the cooler body. The undercover is attached to the body of the vehicle, such that a gap is provided between the undercover and the lower surface of the cooler body, and such that the sealing member fluid-tightly closes the gap.

6 Claims, 7 Drawing Sheets

(51) Int. Cl.
  *B60K 13/04*   (2006.01)
  *B60K 11/06*   (2006.01)
  *B60K 11/04*   (2006.01)
  *B60K 1/00*    (2006.01)

(56) References Cited

U.S. PATENT DOCUMENTS

| | | | | |
|---|---|---|---|---|
| 6,435,298 | B1* | 8/2002 | Mizuno | B62D 35/02 |
| | | | | 180/346 |
| 8,544,583 | B2* | 10/2013 | Ajisaka | B60K 11/08 |
| | | | | 180/68.1 |
| 8,584,778 | B2* | 11/2013 | Wolf | B60K 11/04 |
| | | | | 180/68.1 |
| 8,651,211 | B2* | 2/2014 | Wolf | B62D 35/007 |
| | | | | 180/68.1 |
| 2002/0073977 | A1* | 6/2002 | Craig | B60K 13/02 |
| | | | | 123/556 |
| 2015/0021951 | A1* | 1/2015 | Maurer | B60K 11/06 |
| | | | | 296/180.1 |
| 2018/0257482 | A1* | 9/2018 | Kondo | B60K 13/04 |
| 2019/0232777 | A1* | 8/2019 | Nakamura | B60K 11/04 |
| 2019/0232778 | A1* | 8/2019 | Nakamura | B60K 11/02 |
| 2020/0063639 | A1* | 2/2020 | Nakamura | F01P 11/10 |

* cited by examiner

VEHICLE HAVING COOLING DEVICE

CROSS-REFERENCE TO RELATED APPLICATIONS

This application claims priority from Japanese Patent Application No. 2018-016802 filed on Feb. 1, 2018, the entire disclosure at which is herein incorporated by reference in its entirety.

TECHNICAL FIELD

The present disclosure relates to a vehicle wherein a body of a heat exchanging type cooling device is disposed in a lower portion of the vehicle and attached to a body of the vehicle.

BACKGROUND

There is known a vehicle wherein a body of a heat exchanging type cooling device through which a coolant such as an oil or a water flows is disposed in a lower portion of the vehicle such that the body of the cooling device is attached to a body of the vehicle. JP2017-94771A discloses an example of such a vehicle. In this vehicle, a transaxle to drive rear wheels of the vehicle is disposed backward of a central portion of the vehicle body, and the body of the cooling device for cooling the coolant in the transaxle is disposed in a rear and lower portion of the vehicle body. Further, JP2006-103365A describes a cooling technique of a differential pressure air introducing type to cool an electric power source device of a vehicle with ambient air. The vehicle has an air exhaust duct wherein a negative air pressure is generated with an air stream generated during running of the vehicle. The air existing within the electric power source device (the ambient air used to cool the electric power source device) is exhausted into the outside atmosphere through the air exhaust duct, under the negative air pressure within the air exhaust duct, while fresh ambient air is introduced into the electric power source device through the air intake duct.

The vehicle to which the body of the cooling device (hereinafter referred to as "cooler body") is disposed in a lower portion of the vehicle has a risk that foreign matters such as pebble stones and muddy substances splashed by the rear wheels come into collision with the cooler body, causing damaging of the cooler body or clogging of the cooler body, and consequent deterioration of cooling performance at the cooling device. In view of this risk, it is considered to provide an undercover below the cooler body. However, the undercover may be subjected to an upward impact load due to collision with raised or recessed parts of the roadway surface, which upward impact load is transmitted to the cooler body through the undercover, giving rise to a risk of damaging of the cooler body. This risk is particularly high where the cooling device is of the differential pressure air introducing type in which the ambient air introduced into the cooler body to cool the coolant with heat exchanging between the coolant and the ambient air flows through the cooler body and is discharged downward from the cooler body through a lower surface of the cooler body and exhausted into the outside atmosphere under the negative air pressure due to the air stream generated during running of the vehicle. In this case, the undercover has an air exhaust passage through which the ambient air discharged from the cooler body is exhausted into the outside atmosphere. The air exhaust passage is formed in a fluid-tight contact with the lower surface of the cooler body, so that the impact load applied to the undercover is transmitted directly to the cooler body.

SUMMARY

The present disclosure was made in view of the background art described above. It is therefore an object of the present disclosure to provide a vehicle in which the cooler body of the cooling device is disposed in the lower portion of the vehicle, and which is configured to reduce a risk of damaging of the cooler body due to the upward impact load applied to the undercover and transmitted to the cooler body.

The object indicated above is achieved according to the following aspects of the present disclosure.

According to a first aspect of the present disclosure, there is provided a vehicle comprising rear wheels, and a heat exchanging type cooling device through which a coolant flows and which includes a cooler body disposed in a rear portion of the vehicle and attached to a body of the vehicle, wherein an ambient air introduced into the cooler body to cool the coolant with heat exchanging between the coolant and the ambient air flows through the cooler body and is discharged downward through a lower surface of the cooler body, the cooling device comprising: an undercover disposed below the cooler body and having an air exhaust passage into which the ambient air discharged through the lower surface of the cooler body is introduced and through which the ambient air is exhausted into outside atmosphere, under a negative air pressure generated due to an air stream generated during running of the vehicle; and an elastically deformable sealing member in a closed form interposed between the air exhaust passage and the lower surface of the cooler body. The undercover is attached to the body of the vehicle, such that a gap is provided between the undercover and the lower surface of the cooler body, and such that the sealing member fluid-tightly closes the gap.

In a second aspect of the present disclosure, the vehicle according to the first aspect of the present disclosure further comprises a high-strength component which is fixed to the body of the vehicle and which is disposed near the cooler body and the undercover. The high-strength component has a higher degree of strength with respect to an upward impact load than the cooler body and the undercover, and has a lower lowest point than the undercover. The high-strength component is disposed near the cooler body and undercover such that the high-strength component can come into collision with the roadway surface during running of the vehicle on raised or recessed parts of the roadway surface, before the undercover comes into collision with the roadway surface, and such that a shortest distance from the cooling device to the high-strength component in the horizontal plane is not, without limitation, larger than 30 cm or, in some embodiments, approximately 20 cm, for example. The shortest distance is suitably determined according to a difference of the lowest points of the undercover.

In a third aspect of the present disclosure, the vehicle according to the first or second aspect of the present disclosure is configured such that the undercover is connected to the cooler body with a connector a connection strength of which is determined such that the undercover is disconnected from the cooler body, before damaging of the cooler body due to connection of the undercover to the cooler body through the connector, upon application of an upward impact load to the undercover.

In a fourth aspect of the present disclosure, the vehicle according to any one of the first, second and third aspect of the present disclosure is configured such that the cooler body has a flat box outer configuration having upper and lower surfaces which are located below a floor panel of the vehicle and are substantially parallel to a horizontal plane and each of which has a large area, and the ambient air is introduced into the cooler body through the upper surface of the cooler body, and is discharged front the cooler body through the lower surface of the cooler body. The upper and lower surfaces of the flat box outer configuration of the cooler body may be substantially parallel opposite two major surfaces of an elongate prism, or substantially parallel opposite end faces of a cylindrical or elliptical pillar having a small height dimension. In some embodiments, the thickness of the prism, or the height of the cylindrical or elliptical pillar is not larger than ½ or approximately ⅓ of a length of a diagonal line between the opposite two surfaces of the prism in longitudinal cross section, or a diameter of the cylindrical pillar or a dimension of the elliptical pillar along its major axis. The upper and lower surfaces of the flat box outer configuration need not be strictly parallel to each other, and strictly parallel to the horizontal plane, and may be inclined at an angle within, a range of ±15° or approximately ±10°, with respect to the longitudinal (running) or transverse (width) direction of the vehicle, depending upon required conditions for installation of the cooler body on the vehicle.

In a fifth aspect of the present disclosure, the vehicle according to any one of the first through fourth aspects of the present disclosure is configured such that the air exhaust passage is an air outlet formed below the cooler body so as to extend through the undercover in a vertical direction such that the ambient air is exhausted through the air outlet downward from the cooler body, and the undercover is provided with a plurality of fins disposed within the air outlet such that the fins are spaced apart from each other in a longitudinal direction of the vehicle, each of the fins extending in a width direction of the vehicle and being inclined such that a lower end of the fin is located backward of an upper end of the fin in the longitudinal direction of the vehicle.

In a sixth aspect of the present disclosure, the vehicle according to any one of the first through fifth aspect of the present disclosure is configured such that the cooling device further comprises an air intake duct which is disposed on the cooler body in fluid-tight contact with an upper surface of the cooler body and which has an air inlet formed in an end portion of the air intake duct, so that the fresh ambient air is introduced through the air inlet into the air intake duct and introduced from the air intake duct into the cooler body through the upper surface of the cooler body when the ambient air discharged from the cooler body is exhausted through the air exhaust passage into the outside atmosphere under the negative air pressure generated at a lower open end of the air exhaust passage.

In the vehicle according to the first aspect of the present disclosure, the undercover is disposed below the cooler body into which the ambient air introduced into the cooler body to cool the coolant by heat exchange is discharged downward from the cooler body through the lower surface of the cooler body into the outside atmosphere, the undercover protects the cooler body from the foreign matters such as pebble stones and muddy substances splashed from the roadway surface, making it possible to reduce the risk of deterioration of the cooling performance of the cooling device due to damaging and clogging of the cooler body. Further, the undercover is attached to the body of the vehicle such that the gap is provided between the undercover and the lower surface of the cooler body, so that the upward impact load applied to the undercover due to collision of the undercover with raised or recessed parts of the roadway surface is received by the vehicle body, whereby the above-indicated gap permits a vertical displacement of the undercover relative to the cooler body by a distance corresponding to an amount of the gap, making it possible to reduce the risk of damaging of the cooler body due to the impact load transmitted thereto, owing to the relative vertical displacement and deformation of the undercover.

The undercover has the air exhaust passage through which the air discharged downward from the cooler body is exhausted into the outside atmosphere under the negative air pressure generated within the air outlet due to the air stream generated during running of the vehicle. There is interposed the elastically deformable sealing member between the air exhaust passage and the lower surface of the cooler body such that the sealing member fluid-tightly closes the gap. Thus, the sealing member maintains fluid tightness between the air exhaust passage and the lower surface of the cooler body, so that the air discharged from the cooler body is adequately exhausted into the outside atmosphere through the air exhaust passage under the negative air pressure within the air outlet while the fresh ambient air is introduced into the cooler body, so that the cooling device of the differential pressure air introducing type has a high degree of cooling performance, even in the presence of the gap. Further, the elastic deformation of the sealing member upon application of the upward impact load to the undercover, and the presence of the gap permit effective reduction of the risk of damaging of the cooler body.

In the second aspect of the present disclosure, the vehicle according to the first aspect of the present disclosure is configured such that the cooler body and the undercover are disposed near the high-strength component which has the lower lowest point than the undercover. Accordingly, the high-strength component is more likely to come into collision with raised or recessed parts of the roadway surface, before the undercover comes into collision with the raised or recessed parts. Thus, the undercover has a reduced risk of collision with the roadway surface, permitting further reduction of a risk of damaging of the cooler body due to collision of the undercover with the roadway surface.

In the third aspect of the present disclosure, the vehicle according to the first or second aspect of the present disclosure is configured such that the undercover is connected to the cooler body with the connector. Accordingly, the undercover and the cooler body can be held in position relative to each other, even in the presence of the above-indicated gap therebetween, so that adequate fluid tightness between the air exhaust passage and the lower surface of the cooler body can be maintained by the sealing member, whereby the cooling device of the differential pressure air introducing type has a high degree of cooling performance, and is easily assembled. Further, the connection strength of the connector is determined such that the undercover is disconnected from the cooler body, before damaging of the cooler body due to connection of the undercover to the cooler body through the connector, upon application of the upward impact load to the undercover. Accordingly, there is not a risk of damaging of the cooler body due to the connection of the undercover to the cooler body.

In the vehicle according to the fourth aspect of the present disclosure the cooler body has the flat box outer configuration having the upper and lower surfaces which are located below the floor panel of the vehicle and are substantially parallel to the horizontal plane and each of which has the large area, the ambient air is introduced into the cooler body through the upper surface of the cooler body, and is discharged from the cooler body through the lower surface of the cooler body. Accordingly, the cooler body can be disposed compactly in a small space below the floor panel, and the ambient air for cooling the coolant can efficiently flow into the cooler body through the upper surface and from the cooler body through the lower surface, so that the cooling device has a high degree of air cooling performance.

In the vehicle according to the fifth aspect of the present disclosure the air exhaust passage in the form the air outlet is formed so as to extend through the undercover in the vertical direction such that the ambient air is exhausted through the air outlet downward from the cooler body, the undercover having the air exhaust passage has a simpler, more compact and less costly structure than in the case where the air exhaust passage is open sideways of the vehicle. Further, the undercover is provided with the plurality of fins disposed within the air outlet such that the fins are spaced apart from each other in the longitudinal direction of the vehicle. Each of the fins extends in the width direction of the vehicle and is inclined such that the lower end of the fin is located backward of the upper end of the fin in the longitudinal direction of the vehicle. By suitably determining the length dimensions, inclination angles and spacing distances of the fins, the ambient air discharged from the cooler body through the lower surface of the cooler body can be adequately exhausted into the outside atmosphere along the plurality of fins, and the cooler body can be adequately protected by the fins from muddy substances and other foreign matters splashed from the roadway surface.

In the vehicle according to the sixth aspect of the present disclosure, the air intake duct is disposed on the cooler body in fluid-tight contact with the upper surface of the cooler body, and has the air inlet formed in the end portion, so that the fresh ambient air is introduced through the air inlet into the air intake duct and introduced from the air intake duct into the cooler body through the upper surface of the cooler body when the ambient air discharged from the cooler body is exhausted through the air exhaust passage into the outside atmosphere under the negative air pressure generated at the lower open end of the air exhaust passage. Accordingly, the ambient air smoothly flows through the cooler body to efficiently cool the coolant, such that the ambient air introduced into the cooler body through the upper surface flows downward through the cooler body, and is discharged from the cooler body through the lower surface.

DETAILED DESCRIPTION

Figure 1:
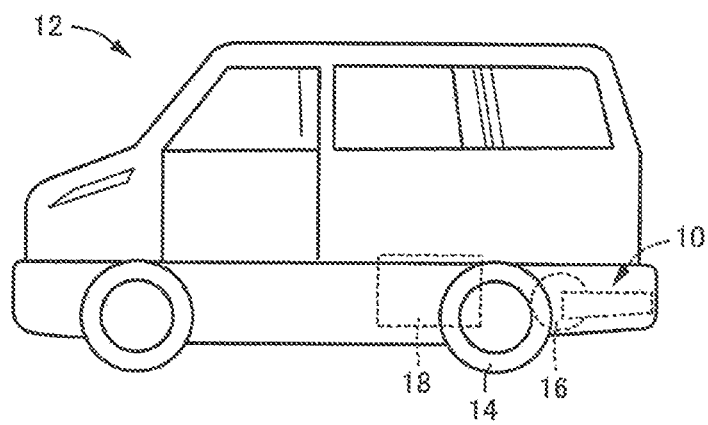
FIG. 1 is a schematic view showing a vehicle according to the present disclosure.

The present disclosure is applicable to various types of vehicles such as an engine-drive vehicle provided with a drive power source such as a gasoline engine, a diesel engine or any other type of internal combustion engine; an electric vehicle provided with at least one electric motor as a vehicle drive power source; a hybrid vehicle provided with an internal combustion engine and at least one electric motor as a vehicle drive power source; and a fuel-cell type electric vehicle having a fuel cell device as an electric power source for operating at least one electric motor. The cooling device including the cooler body as a component is configured to cool a coolant (cooling medium) such as an oil or water used to cool heat generating components of a vehicle such as an internal combustion engine, at least one electric motor, a battery, an inverter, an electric power source device, an electronic controller, and a power transmitting mechanism including gear trains and a transmission belt.

For example, the present disclosure is applicable suitably to a rear-wheel-drive vehicle of a type in which a drive power source to drive rear drive wheels is disposed in a rear portion of the vehicle, but is applicable also to a rear-wheel-drive vehicle of a type in which the drive power source to drive the rear drive wheels is disposed in a front portion of the vehicle. The present disclosure is further applicable to a front-and-rear-wheel-drive vehicle (a four-wheel or all-wheel drive vehicle), and a front-wheel-drive vehicle in which rear wheels are idler wheels. The cooler body is suitably disposed in a lower portion of the vehicle located backward of the rear wheels in the running or longitudinal direction of the vehicle, for instance. However, the cooler body may be disposed in a lower portion of the vehicle located forwardly of the rear wheels. Further, the cooler body may be disposed such that the cooler body is located backward of one or both of the rear wheels or at an intermediate position of the rear wheels with regard to the width or transverse direction of the vehicle.

The undercover has the air exhaust passage in which the negative pressure is generated due to the air stream generated during running of the vehicle. In some embodiments, the air exhaust passage is formed so as to extend through the undercover in the vertical direction. However, the air exhaust passage may be formed so as to extend in the width direction of the vehicle such that the air exhaust passage is open sideways of the vehicle, at a position distant from the cooler body. The differential pressure air introducing type cooling device including the cooler body and the undercover having the air exhaust passage may further include an air intake duct having an air inlet, as needed. The air exhaust passage and the air intake duct may be provided with an electrically operated fan. For example, the air inlet of the air intake duct is generally formed so as to be open backward, upwardly, rightwards or leftwards of the vehicle, but may be open forwardly of the vehicle. For example, the air intake duct is generally configured so as to introduce the ambient air into the cooler body through the upper surface of the cooler body, but may be configured to introduce the ambient air into the cooler body through a front, rear, right or left surface of the cooler body. The air intake duct is generally formed so as to extend from the cooler body forwardly or backward from the cooler body, but may be formed so as to extend from the cooler body sideways or upwardly of the vehicle. Further, the air intake duct need not be provided. In this case, the ambient air is introduced into the cooler body directly through the upper surface of the cooler body.

For example, the cooler body has a flat box outer configuration having upper and lower surfaces which are located below a floor panel of the vehicle and are substantially parallel to a horizontal plane and each of which has a large area. The ambient air is introduced into the cooler body through the upper surface, and is discharged downward through the lower surface. However, the cooler body may be an elongate box having a comparatively large length in the longitudinal direction of the vehicle. However, a shape, an attitude of installation, a position of an ambient air inlet and other specifications of the cooler body are suitably determined according to specific conditions of installation of the cooler body on the vehicle. Although the cooler body is a single body member disposed below the floor panel of the vehicle, the cooler body may consist of a plurality of body members. Where the vehicle according to the present disclosure is an electric vehicle not provided with an engine, the air inlet of the air intake duct may be attached to an opening of a bumper designed for an engine-drive vehicle, which opening is held in communication of an exhaust pipe of the engine-drive vehicle. While the cooler body is suitably disposed below the floor panel of the vehicle, the cooler body may be disposed otherwise, for instance, along a side surface of the vehicle extending in its longitudinal direction or along a cross member parallel to the width direction of the vehicle.

In some embodiments, the undercover is a one-piece body formed of a synthetic resin material such as polypropylene (PP), for example. However, the undercover may consist of a plurality of members connected to each other, or may incorporate metallic inserts or sheets inserted into or bonded to its selected parts. Further, the undercover may be formed of a metallic material, or may consist of a combination of a metallic member and a synthetic resin member. The above descriptions with respect to the undercover may apply to the air intake duct. For example, the cooler body and the undercover are fixed independently of each other, to the floor panel, a cross member or any other member of the vehicle body. However, the cooler body and the undercover may be fixed to the vehicle body through common metallic attachment brackets. For instance, the air intake duct is fixed to the cooler body. However, the air intake duct may be fixed directly to the floor panel, cross member, bumper or any other member of the vehicle body.

While an adequate amount of the gap between the undercover and the lower surface of the cooler body differs depending upon the specific type of the vehicle, the amount of the gap is not smaller than 10 mm or 15 mm, for example, for effectively reducing an impact load applied to the cooler body upon displacement or deformation of the undercover due to an upward impact load applied thereto, or for effectively absorbing the impact load owing to elastic deformation of the sealing member. Further, the amount of the gap is not larger than 30 mm or 25 mm, for example, for compactly disposing the cooler body and the undercover below the floor panel, so as to maintain a required minimum distance of the undercover from the roadway surface. In some embodiments, the amount of the gap may exceed 30 mm in some specific type of the vehicle. The sealing member has a thickness (dimension in the vertical direction), which is larger than the amount of the gap, to permit closing of the gap. The sealing member is formed of one of various kinds of elastic materials such as packing and rubber materials. In some embodiments, the cooler body and the undercover are disposed near a high-strength component of the vehicle the lowest point of which is lower than that of the undercover. However, the high-strength component need not be present near the cooler body and the undercover. Examples of the high-strength component include cross or side members, frames and other members of the vehicle body, and a hydrogen tank provided where the vehicle is an electric vehicle having a fuel cell type drive power source.

The undercover may be merely attached to the floor panel, cross member, bumper or any other member of the vehicle body. However, the undercover may be pre-fixed to the cooler body through a connector member and positioned relative to the cooler body. A strength of fixing of the undercover to the cooler body through the connector member is determined such that a state of fixing of the undercover to the cooler body is lost upon application of an upward impact load to the undercover, before the cooler body is damaged due to the fixing of the undercover to the cooler body. The loss of the state of fixing of the undercover to the cooler body may be a result of removal of the undercover from the cooler body due to breakage of the connector member, or a result of establishment of a state in which the undercover is vertically displaceable relative to the cooler body. The undercover may be attached to the cooler body such that the undercover is vertically displaceable relative to the cooler body, irrespective of whether there is the upward impact load to the undercover.

Where the undercover has the air outlet serving as the air exhaust passage located below the cooler body, fins are provided within the air exhaust passage, for protecting the cooler body from splashed foreign matters such as muddy substances while permitting the air discharged from the cooler body to be exhausted downward into the outside atmosphere with the negative air pressure. However, the fins may not be provided, where there is a low possibility of entry of the foreign matters into the cooler body, for example, where the air exhaust passage is open in a side surface of the vehicle. Length dimensions, number, inclination angles, spacing distances in the vehicle longitudinal direction and other specifications of the fins disposed within the air exhaust passage are adequately determined so as to minimize disturbance of flow of the air discharge from the cooler body while preventing entry of splashed muddy substances and pebble stones, on the basis of a position of the air exhaust passage relative to the rear wheels. In some embodiments, the angle of inclination of each fin with respect to the horizontal plane so as to extend downward as the fin extends backward of the vehicle may be, for example selected within a range of approximately 30° to 60°. In some embodiments, the angle of inclination may be selected outside the above-indicated range. Further, the angle of inclination of the fins may be changed continuously or in steps. While the fins may be curved in a downward convex shape (along a part of an arc of a cylinder) in cross section in the longitudinal direction of the vehicle, the fins may take any one of various other forms. For example, the fins may be flat plates, or plates which are bent at least one point in the longitudinal direction of the vehicle.

The length dimensions of the fins between their upper and lower ends may be changed continuously or in steps, depending upon the positions of the fins in the longitudinal direction of the vehicle. However, all of the fins may have a predetermined same length dimension, irrespective of the positions of the fins in the longitudinal direction of the vehicle. In some embodiments, the plurality of fins are spaced apart from each other in the longitudinal direction of the vehicle by a predetermined constant distance. In some other embodiments, the distance of spacing of the adjacent fins may be changed continuously or in steps. Further, the plurality of fins may be disposed such that the adjacent fins partially overlap each other in the longitudinal direction of the vehicle.

Embodiments of the present disclosure will be described in detail by reference to the drawings. It is to be understood that the drawings showing the embodiment are simplified or transformed as needed, and do not necessarily accurately represent dimensions and shapes of various elements of the embodiment.

Reference is first made to FIG. 1, which is the schematic left side elevational view of a vehicle 12 provided with a cooling device 10. The vehicle 12 is an electric vehicle of a fuel cell type having a fuel cell device, an electric motor M (shown in FIG. 2) and rear wheels 14. The fuel cell device generates an electric power with which the electric motor M is operated to generate a drive force for driving the rear wheels 14 for running of the vehicle 12. The fuel cell device includes a hydrogen tank 16 charged with a hydrogen used as a fuel. The hydrogen tank 16 and the cooling device 10 are disposed backward of the rear wheels 14 as viewed in a running or longitudinal direction of the vehicle 12. The cooling device 10 is configured to cool a coolant in the form of an oil, with heat exchanging between the oil and an ambient air. The cooled oil is supplied to the electric motor M, a transaxle, an electric power source device, etc. for cooling these components of the vehicle 12. A vehicle drive system 18 including the electric motor M and the transaxle are also disposed near the rear wheels 14 in the longitudinal direction of the vehicle 12. Thus, the vehicle 12 according to the present disclosure is a rear-wheel-drive vehicle of a type wherein a drive power source is disposed in a rear portion of the vehicle. The cooling device 10 consists of a pair of right and left units disposed on respective right and left sides of the vehicle 12. These two units are substantially symmetrical in construction with each other in the width direction of the vehicle 12. Hereinafter, the right unit of the cooling device 10 will be described in detail.

Figure 2:
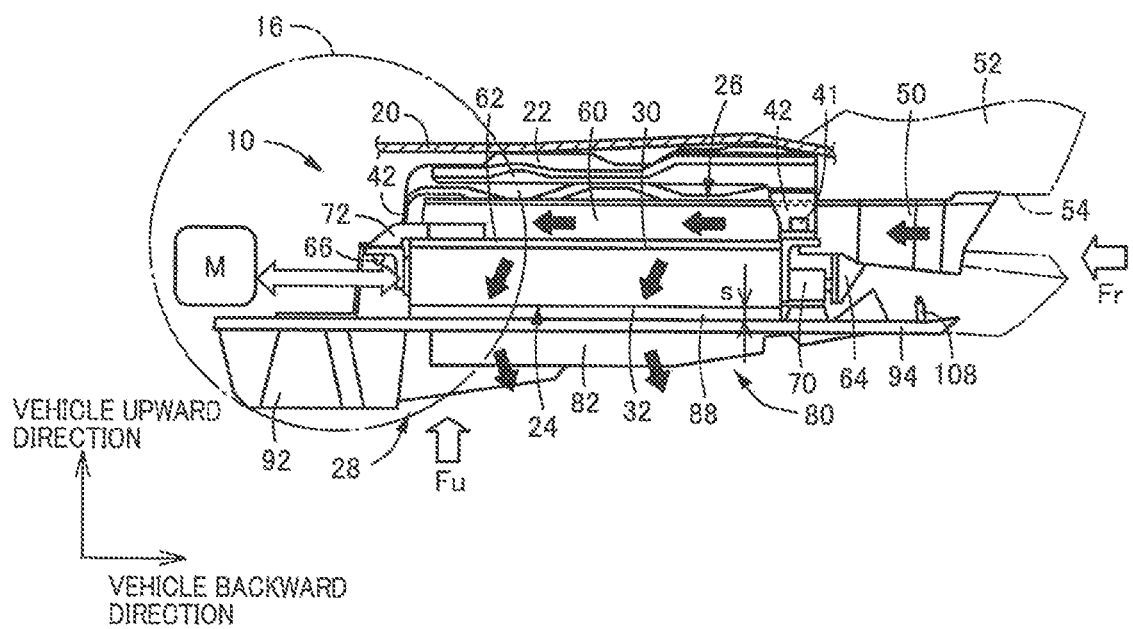
FIG. 2 is a left side elevational view of a cooling device of the vehicle of FIG. 1.
Figure 3:
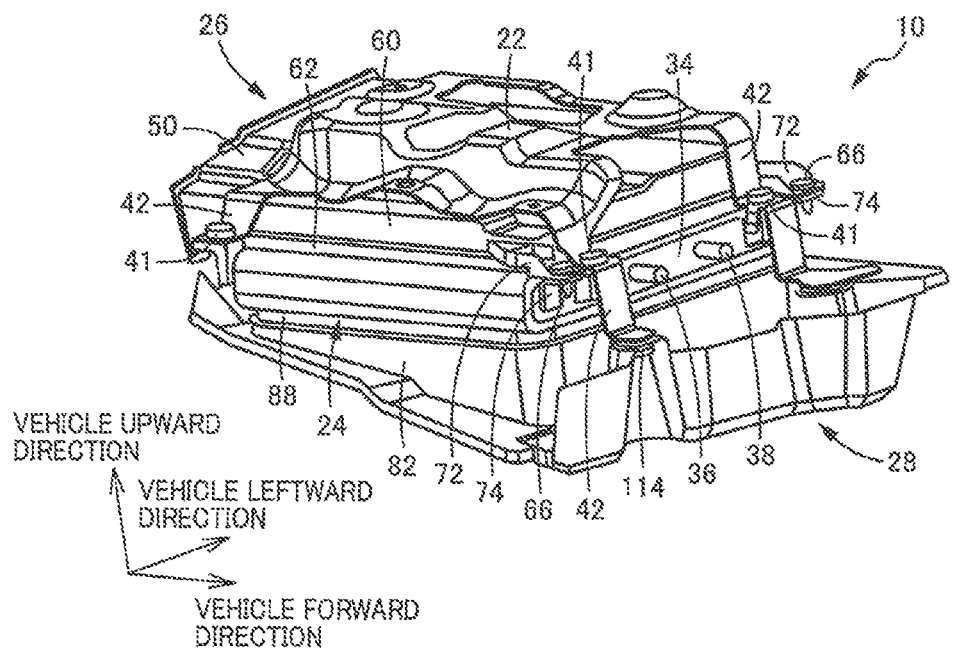
FIG. 3 is a perspective view of the cooling device of FIG. 2 as seen backward of the vehicle in an obliquely leftward and downward direction of the vehicle.
Figure 4:
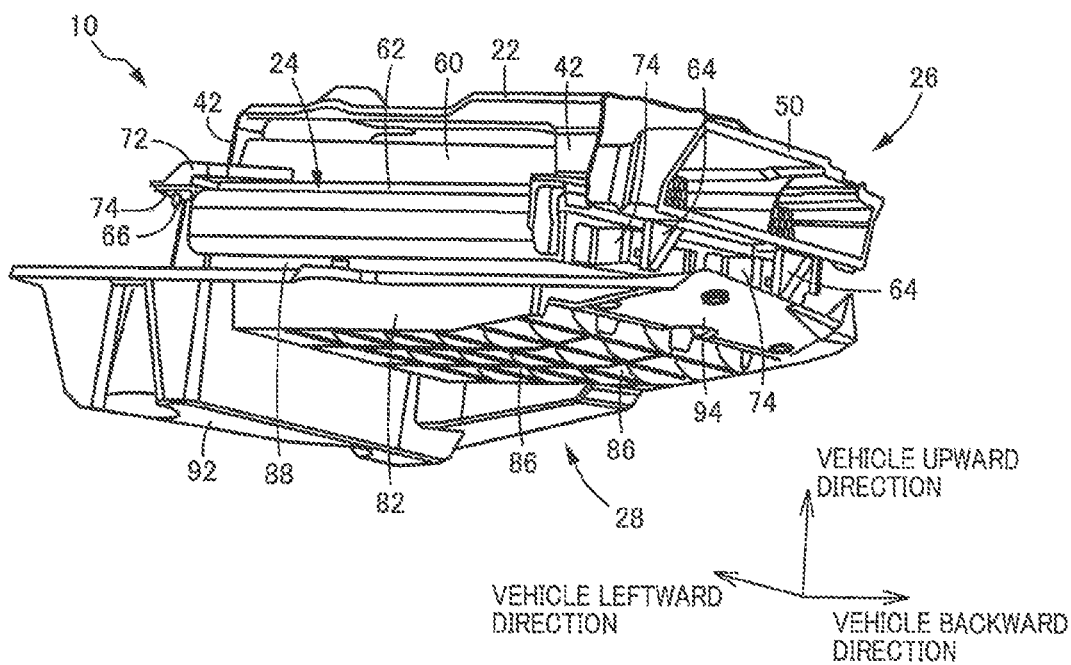
FIG. 4 is a perspective view of the cooling device of FIG. 2 as seen forwardly of the vehicle in an obliquely rightward and upward direction of the vehicle.
Figure 5:
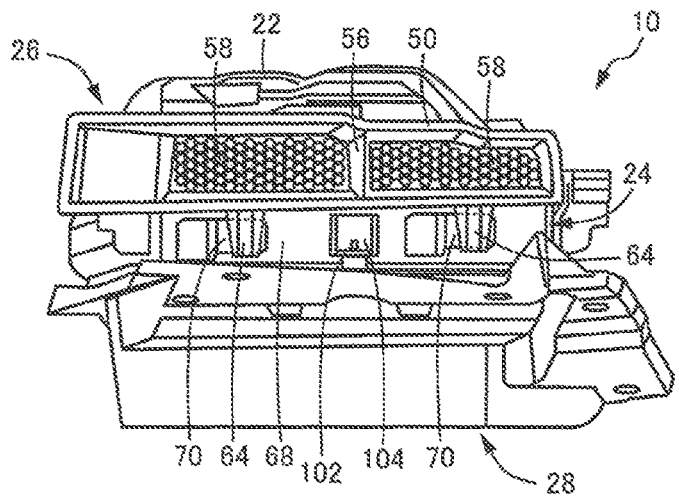
FIG. 5 is a rear end elevational view of the cooling device of FIG. 2 as seen forwardly of the vehicle in the horizontal direction.

FIG. 2 is the left side elevational view of the cooling device 10 of the vehicle 12 of FIG. 1. The cooling device 10 is disposed below a floor panel 20 of the vehicle 12, and is attached to a lower surface of the floor panel 20 through a metallic cooler attachment bracket 22. FIG. 3 is the perspective view of the cooling device 10 as seen backward of the vehicle 12 in an obliquely leftward and downward direction of the vehicle 12, and FIG. 4 is the perspective view of the cooling device 10 as seen forwardly of the vehicle 12 in an obliquely rightward and upward direction of the vehicle 12, while FIG. 5 is the rear end devotional view of the cooling device 10 as seen forwardly of the vehicle 12 in the horizontal direction. The cooling device 10 includes a cooler body 24, an air intake duct 26 for introducing the ambient air into the cooler body 24, and an undercover 28 disposed below the cooler body 24 to protect the cooler body 24 from muddy substances and other foreign matters splashed from the rear wheels 14. The floor panel 20 is a part of the body of the vehicle 12, and the undercover 28 functions as an air exhaust duct into which the air discharged downward from the cooler body 24 is introduced and through which the discharged air is discharged downward. The cooler attachment bracket 22 fixed to the floor panel 20 may also be considered to be a part of the body of the vehicle 12.

The cooler body 24 is formed of a metallic material such as an aluminum casting, and has a flat box outer configuration, more specifically, a thin rectangular parallelepiped. The cooler body 24 has substantially horizontally extending rectangular upper and lower surfaces 30 and 32 each having a large area. A rectangle of each of the upper and lower surfaces 30 and 32 has opposite sides (longer sides, for example) parallel to the running or longitudinal direction of the vehicle 12. The rectangular parallelepiped of the cooler body 24 is defined such that their rectangular upper and lower surfaces 30 and 32 are substantially parallel to each other, and such that a height of the cooler body 24 is, without limitation, not larger than ⅓ of a length of a diagonal line of the above-indicated rectangle. The cooler body 24 has at least one coolant flow passage (conduit) formed over an entire area of the rectangular parallelepiped, so that the oil serving as the coolant flows through the coolant flow passage. The ambient air introduced into the cooler body 24 through a substantially entire area of the rectangular upper surface 30 flows around the coolant flow passage, and is discharged downward through a substantially entire area of the rectangular lower surface 32, whereby the oil within the coolant flow passage is cooled with heat exchanging between the oil and the ambient air. The cooler body 24 has a pair of connecting ports 36 and 38 on a front surface, one of which is connected to an oil supply conduit through which the oil is supplied to the electric motor M and other devices to be cooled, and the other of which is connected to an oil return conduit through which the oil is returned from the devices to be cooled.

Figure 13:
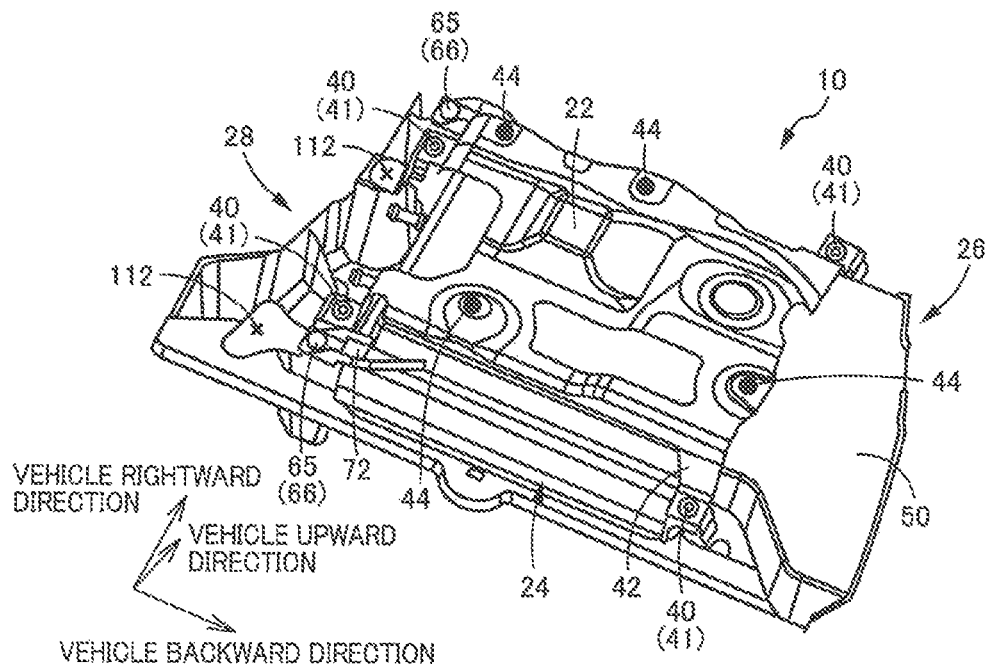
FIG. 13 is a perspective view of the cooling device of FIG. 2 as seen downward of the vehicle in an obliquely rightward direction of the vehicle.

The cooler body 24 has four cooler fixing portions 40 shown in FIG. 13, and is fixed to the cooler attachment bracket 22 with metallic fixing bolts 41 (shown in FIG. 3 as well as in FIG. 13) provided at the cooler fixing portions 40. The cooler attachment bracket 22 is provided with two front arm portions 42 at two right and left front portions and two rear arm portions 42 at two right and left rear portions, as viewed in the running direction of the vehicle 12, such that the right and left front and rear arm portions 42 are disposed on respective right and left sides of the air intake duct 26, and such that the arm portions 42 extend downward of the air intake duct 26. The arm portions 42 are superposed on L-shaped metallic bracket members and fastened to the metallic bracket members with the fixing bolts 41 and nuts. The cooler attachment bracket 22 is fixed to the floor panel 20 with metallic fixing bolts (not shown) at four bracket fixing portions 44 shown in FIG. 13. FIG. 13 is the perspective view of the cooling device 10 as seen downward of the vehicle 12 in a rightward and downward direction of the vehicle 12.

The air intake duct 26 is a hollow structure formed of a synthetic resin material such as polypropylene (PP), and is disposed above the cooler body 24 such that a front portion of the air intake duct 26 as seen in the running direction of the vehicle 12 is superposed on the cooler body 24. A rear portion of the air intake duct 26 extends backward from the cooler body 24 in the running direction of the vehicle 12, and has an air inlet 50 through which the ambient air is introduced into the air intake duct 26. The rear portion of the air intake duct 26 is accommodated within an opening 54 formed in a rear bumper 52 of the vehicle 12, such that a rear end of the rear portion is located close to the rear end of the vehicle 12. The opening 54 may be an opening for an exhaust pipe provided on an engine drive vehicle, for instance.

Figure 6:
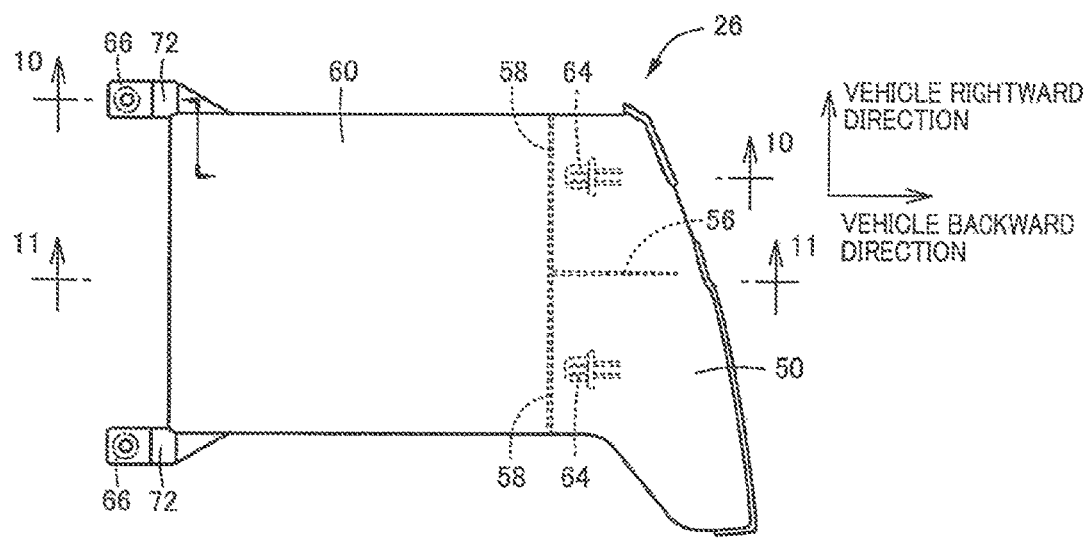
FIG. 6 is a plan view of an air intake duct of the cooling device of FIG. 2.
Figure 7:
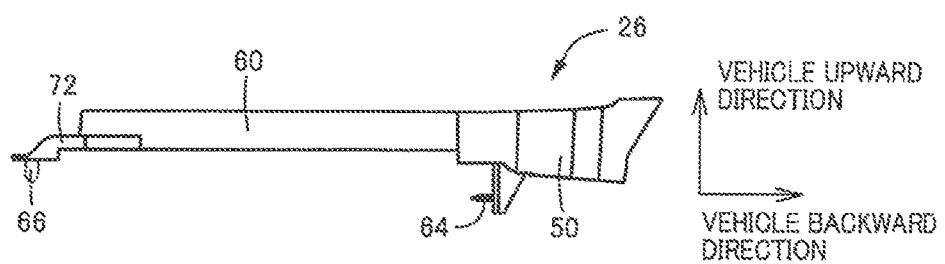
FIG. 7 is a left side (lower side as seen in FIG. 6) elevational view of the air intake duct of FIG. 6.
Figure 10:
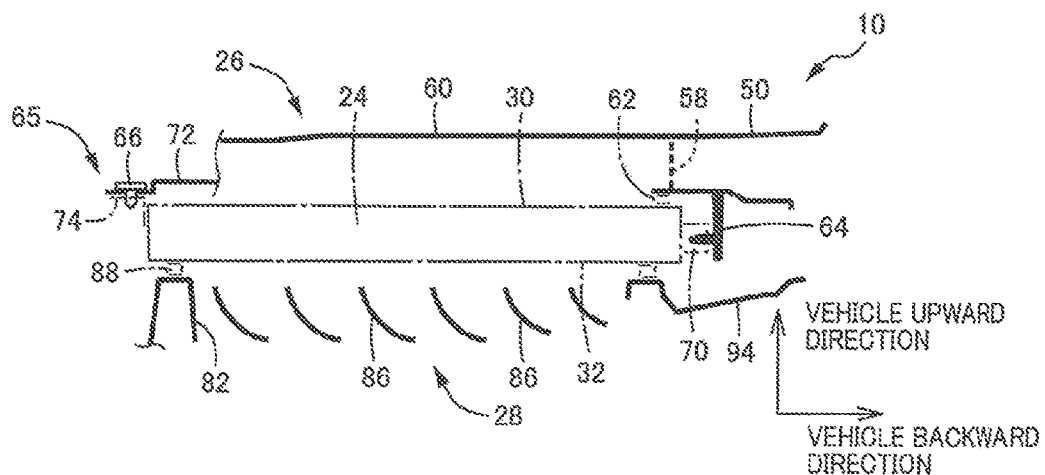
FIG. 10 is a cross sectional view of the cooling device of FIG. 6 taken in a direction along a line 10-10 of FIG. 6.
Figure 11:
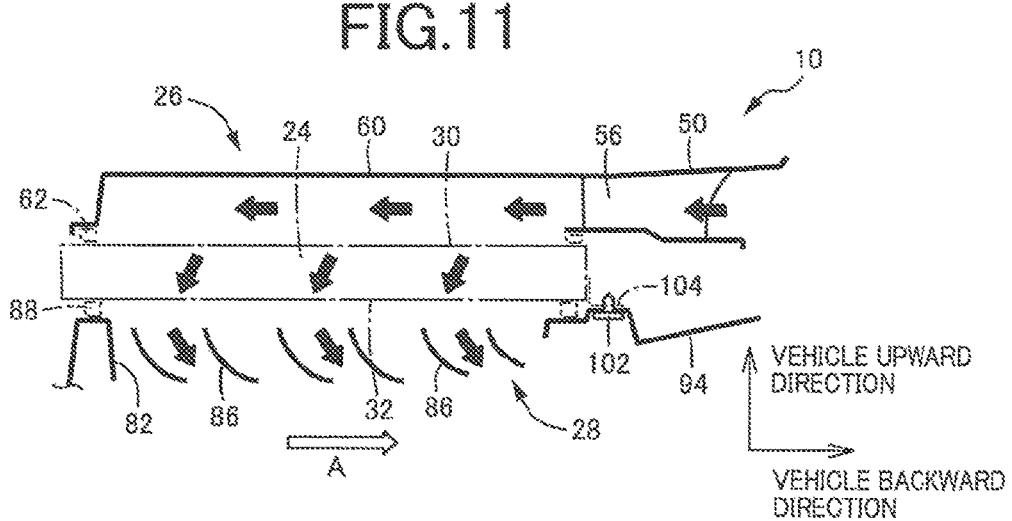
FIG. 11 is a cross sectional view of the cooling device of FIG. 6 taken in a direction along a line 11-11 of FIG. 6.

FIG. 6 is the plan view of the air intake duct 26, and FIG. 7 is the left side (lower side as seen in FIG. 6) elevational view of the air intake duct 26. FIG. 10 is the cross sectional view of the cooling device 10 taken in a direction along a line 10-10 of FIG. 6, and FIG. 11 is the cross sectional view of the cooling device 10 taken in a direction along a line 11-11 of FIG. 6. The air intake duct 26 is a generally flat box hollow rectangular parallelepiped, and is partially superposed on the cooler body 24 such that the air intake duct 26 is movable relative to the cooler body 24 in the forward direction of the vehicle 12, when a load is applied to the air intake duct 26. Described more specifically, the air intake duct 26 is positioned such that the air intake duct 26 does not overlap the cooler body 24 in the vertical direction in the rear end elevational view of FIG. 5 as seen forwardly of the vehicle 12, so that the air intake duct 26 is movable in the forward direction of the vehicle 12 on the cooler body 24. However, a rear portion of the air inlet 50 of the air intake duct 26 may overlap the cooler body 24, as long as the air intake duct 26 is movable forwardly of the vehicle 12 without damaging of the cooler body 24, owing to deformation of the air inlet 50. The air inlet 50 is divided into right and left parts by a partition plate 56, and has integrally formed mesh-type strainers 58 disposed therein, to prevent entry of foreign matters into the air inlet 50.

The front portion of the air intake duct 26 superposed on the upper surface 30 functions as an air inlet portion 60 open downward to introduce the ambient air into the cooler body 24. The air inlet portion 60 covers a substantially entire area of the upper surface 30 of the cooler body 24, so that the ambient air is introduced into the cooler body 24 from the air intake duct 26 through the substantially entire area of the upper surface 30, for instance, without limitation. not smaller than 80% of the entire area in which the at least one coolant flow passage is formed. Between the air inlet portion 60 and the upper surface 30 of the cooler body 24, there is interposed a sealing member 62 such as a packing, in the form of a rectangular frame, so that the air inlet portion 60 is fluid-tightly connected to the upper surface 30 through the sealing member 62. Thick arrow-headed lines in FIG. 11 represent flow paths of the ambient air along which the ambient air introduced into the air intake duct 26 through the air inlet 50 is introduced into the cooler body 24 through the air inlet portion 60, flows through the cooler body 24, and is discharged downward from the cooler body 24. Thick arrow-headed lines in the side elevational view of FIG. 2 represent flow paths of the ambient air substantially identical with those in FIG. 11.

Figure 14:
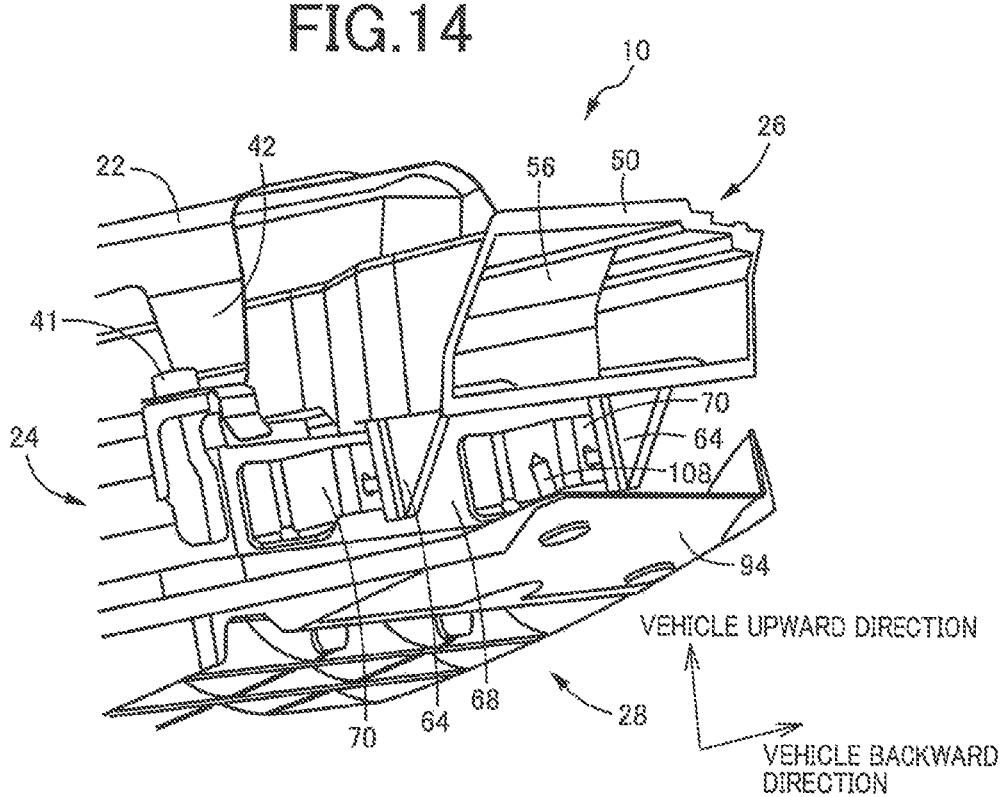
FIG. 14 is a perspective view of a rear portion of the cooling device of FIG. 2 as seen forwardly of the vehicle in an obliquely rightward and upward direction of the vehicle.

The air intake duct 26 constructed as described above is attached to the cooler body 24, with a pair of engaging jaws 64 shown in FIG. 4 and a pair of resin clips 66 shown in FIG. 13. The engaging jaws 64 are formed integrally with the lower surface of the air inlet 50 such that the two engaging jaws 64 are spaced apart from each other in the direction of width of the vehicle 12, while the resin clips 66 are fixed in respective clip fitting portions 65 also shown in FIG. 13. The cooler body 24 has a pair of attaching brackets 70 fixed to a rear surface 68 of the cooler body 24 as shown in FIG. 14. The attaching brackets 70 have respective engaging holes or slits for engagement with protrusions of the engaging jaws 64, such as jaw portions of the engaging jaws 64 which protrude in the forward direction of the vehicle 12, so that a portion of the air intake duct 26 in which the air inlet 50 is formed is prevented from being removed upwardly from the cooler body 24. FIG. 14 is the perspective view of the rear portion of the cooling device 10 as seen forwardly of the vehicle 12 in an obliquely rightward and upward direction of the vehicle 12. The two resin clips 66 are pre-fixed to respective right and left attaching arms 72 formed integrally with the rear portion of the cooling device 10 as seen in the running direction of the vehicle, and the attaching arms 72 are superposed on respective attaching brackets 74 fixed to the front surface 34 of the cooler body 24. In this state, the resin clips 66 are pressed into and through engaging holes formed in the attaching brackets 74, with temporary elastic reduction of diameters of the resin clips 66. Diameters of end portions of the resin clips 66 which have passed the engaging holes are elastically enlarged so that the resin clips 66 are fixed to the attaching brackets 74 such that the resin clips 66 are not removable from the engaging holes. Thus, the air intake duct 26 can be easily attached to the cooler body 24, with a single pressing action of each resin clip 66. Thickness, elasticity, material and other specifications of the sealing member 62 described above are suitably determined so as to ensure desired fluid tightness between the air inlet portion 60 and the upper surface 30 of the cooler body 24. It is noted that the resin clips 66 may be pressed into the engaging holes formed in the attaching arms 72 and the attaching brackets 74 which have been superposed on each other.

A strength of attachment of the air intake duct 26 to the cooler body 24 with the pair of engaging jaws 64 formed of a resin material and the pair of resin clips 66 is sufficiently lower than a strength of attachment of the cooler attachment bracket 22 to the cooler body 24 with the fixing bolts 41 formed of a metallic material. Described in detail, upon application of an impact load Fr to the air inlet 50 of the air intake duct 26 upon collision of the vehicle 12 with a vehicle following the vehicle 12, or with an object during backward running of the vehicle 12 as shown in FIG. 2, some of the engaging jaws 64, the resin clips 66 and the attaching arms 72 are broken, so that the air intake duct 26 is removed from the cooler body 24 and moved forwardly of the vehicle 12, before the cooler body 24 is damaged, whereby the impact load Fr acting on the cooler body 24 is reduced. Accordingly, the present cooling device 10 permits reduction of damaging of the cooler body 24 and prevention of leakage of the oil upon comparatively light collision of the vehicle 12 with the vehicle following the vehicle 12 or the object located backward of the vehicle 12, without direct collision of the cooler body 24 with the other vehicle or the backward object.

Figure 8:
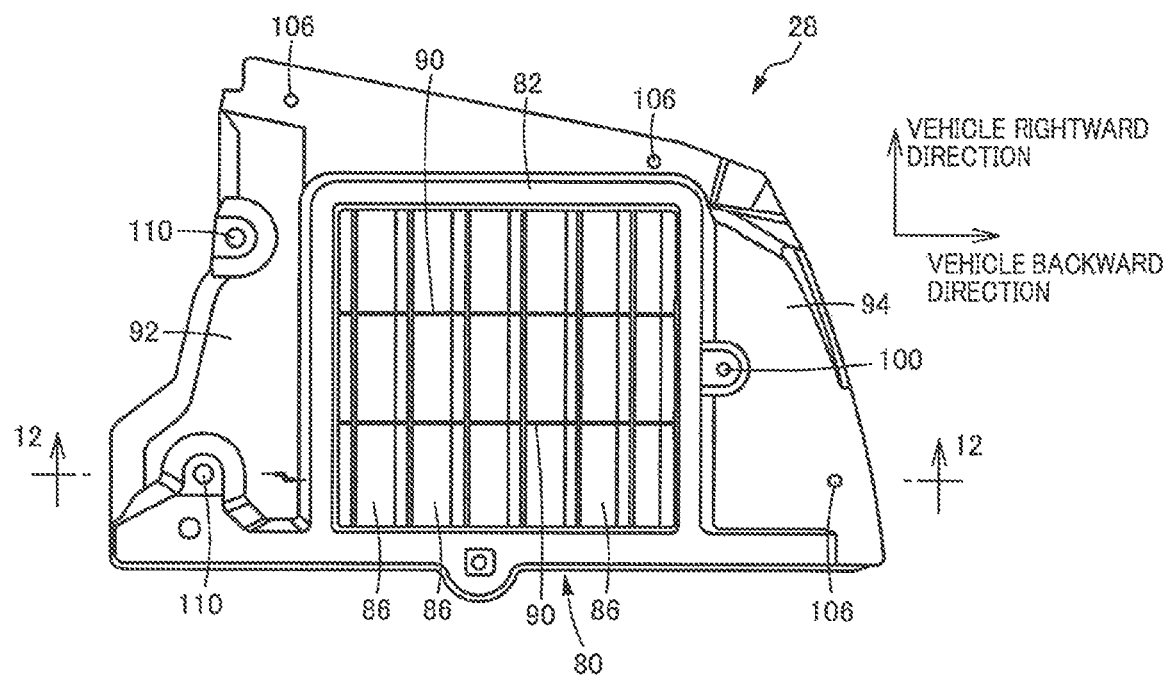
FIG. 8 is a plan view of an undercover of the cooling device of FIG. 2.
Figure 9:
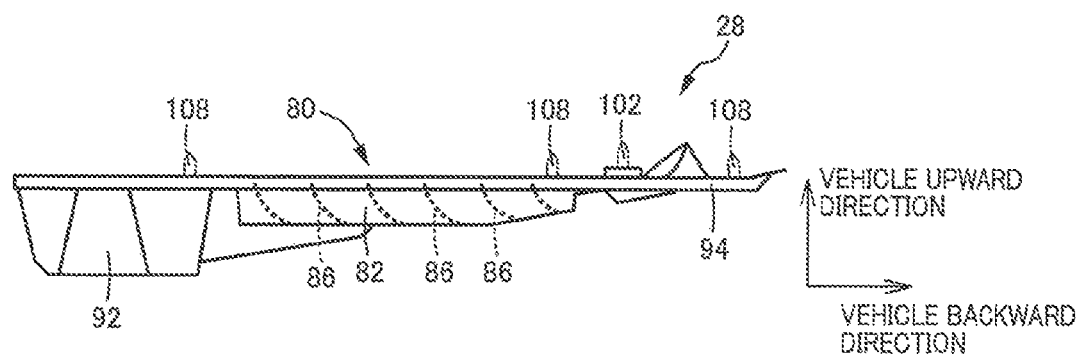
FIG. 9 is a left side (lower side as seen in FIG. 8) elevational view of the undercover of FIG. 8.
Figure 12:
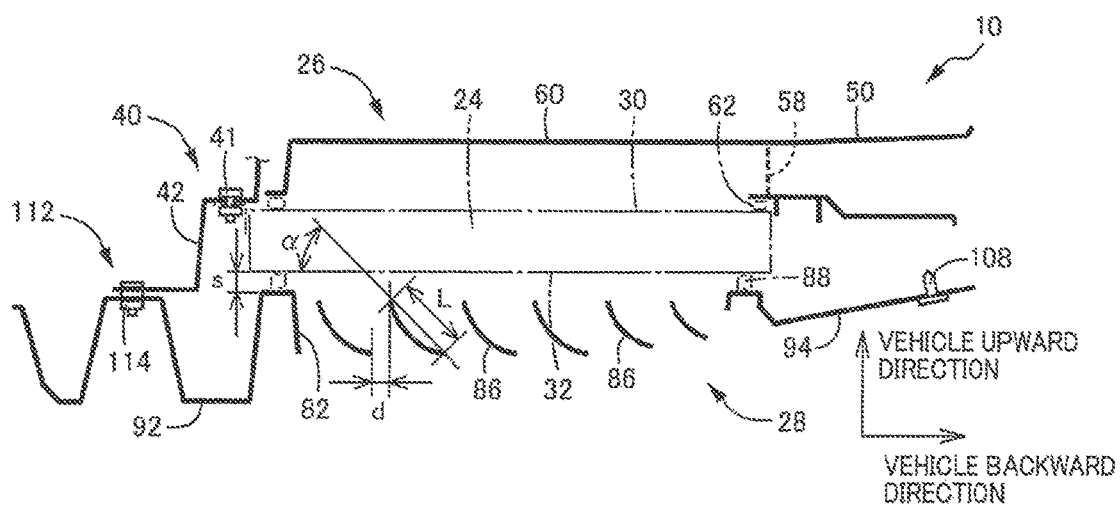
FIG. 12 is a cross sectional view of the cooling device of FIG. 6 taken in a direction along a line 12-12 of FIG. 8.

The undercover 28 functioning also as an air exhaust duct is formed of a synthetic resin material such as polypropylene (PP), and is disposed below the cooler body 24 such that an intermediate portion 80 of the undercover 28 as seen in the running direction of the vehicle 12 is superposed on the cooler body 24. FIG. 8 is the plan view of the undercover 28, and FIG. 9 is the left side (lower side as seen in FIG. 8) elevational view of the undercover 28. FIG. 12 is the cross sectional view of the cooling device 10 taken in a direction along a line 12-12 of FIG. 8. The undercover 28 has a generally flat box configuration, and is disposed below the cooler body 24 such that the cooler body 24 and the undercover 28 are superposed on each other, and such that the undercover 28 is movable relative to the cooler body 24 upon application of a load to the undercover 28. The intermediate portion 80 disposed below the cooler body 24 is a portion also functioning as the air exhaust duct, and has an air outlet 82 formed therethrough in the vertical direction. The air discharged from the lower surface 32 of the cooler body 24 is exhausted downward through the air outlet 82 into the outside atmosphere. The air outlet 82 has a rectangular frame profile corresponding to the rectangular shape of the lower surface 32 of the cooler body 24. Within the air outlet 82, there are disposed a plurality of fins (in this embodiment, six fins) 86 extending substantially parallel to the width direction of the vehicle 12, for protecting the cooler body 24 from muddy substances splashed from the roadway surface.

Figure 15:
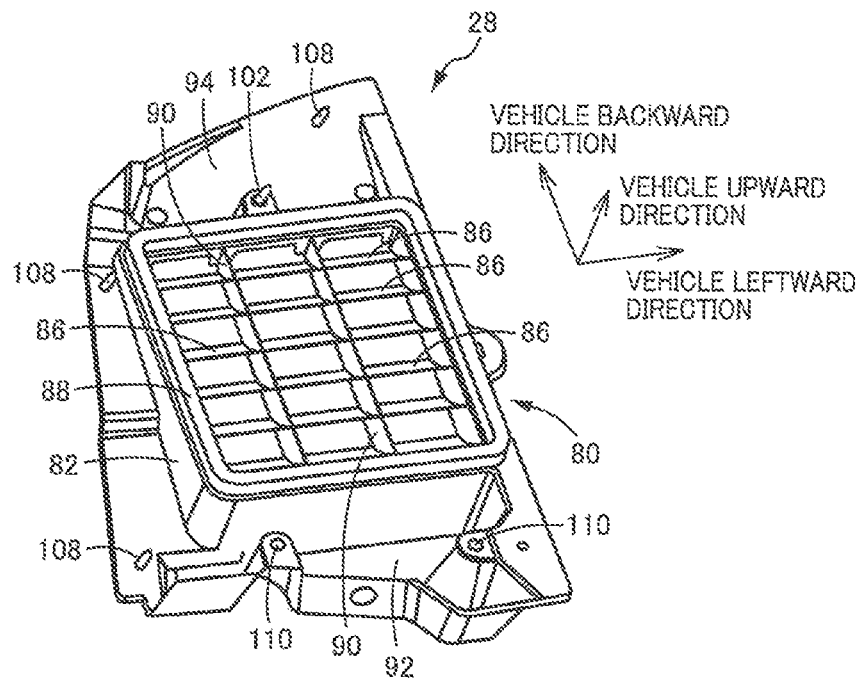
FIG. 15 is a perspective view of the undercover as seen backward of the vehicle in an obliquely leftward and downward direction of the vehicle, when the undercover is provided with a sealing member and a resin clip.

Between an upper open end of the air outlet 82 and the lower surface 32 of the cooler body 24, there is interposed a sealing member 88 such as a packing in the form of a rectangular frame, as shown in FIG. 15, so that the air outlet 82 is fluid-tightly connected to the lower surface 32 through the scaling member 88. The air discharged through a substantially entire area of the lower surface 32, for instance, without limitation, not smaller than 80% of the area in which the coolant flow passage is formed flows into the air outlet 82. FIG. 15 is the perspective view of the undercover 28 with the sealing member 88 as seen backward of the vehicle 12 in an obliquely leftward and downward direction of the vehicle 12. The sealing member 88 is installed in position at the upper open end of the air outlet 82, with an adhesive, for example, such that an upper surface of the sealing member 88 is held in pressed fluid-tight contact with the lower surface 32 of the cooler body 24. The sealing member 88 may be a single piece in the form of a loop or in any other closed form. Alternatively, the sealing, member 88 may consist of a plurality of pieces which are arranged to cooperate to define a loop or any other closed form (such as a rectangular frame). A negative air pressure is generated at a lower open end of the air outlet 82 in the form of a rectangular frame, due to an air stream A (indicated by a white arrow-headed line in FIG. 11) generated during running of the vehicle 12, so that the air discharged from the lower surface 32 of the cooler body 24 is exhausted downward through the air outlet 82, as indicated by thick black arrow-headed lines in FIG. 11, while the fresh air is introduced into the cooler body 24 through the air inlet 50 of the air intake duct 26. Thus, the cooling device 10 of the vehicle 12 according to the present disclosure is of the differential pressure air introducing type. The air outlet 82 functions as an air exhaust passage through which the air is exhausted into the outside atmosphere.

The plurality of fins 86 are configured to protect the cooler body 24 from muddy substances and pebble stones splashed by the rear wheels 14, while permitting the air discharged from the cooler body 24 to be exhausted downward. As shown in FIG. 12, the fins 86 are inclined at a predetermined same angle α with respect to the horizontal plane such that a lower end of the fin 86 is located backward of an upper end of the fin 86 in the longitudinal direction of the vehicle 12. Further, the fins 86 are spaced apart from each other in the longitudinal direction of the vehicle 12, by a predetermined distance d which is determined so as to minimize disturbance of the air flow through the air outlet 82, while preventing entry of the muddy substances and other foreign matters splashed by the rear wheels 14 such that two adjacent fins 86 in the vehicle longitudinal direction are not overlapped each other in the vehicle vertical direction. Furthermore, the fins 86 are curved so as to have a downward convex configuration, and have different length dimensions L between an upper and a lower ends of each of the fins 86 determined such that the length dimensions L of the fins 86 comparatively distant from the rear wheels 14 are smaller than those of the fins 86 comparatively near the rear wheels 14, more specifically, such that the four front fins 86 have substantially two rear fins 86 have smaller length dimensions than the four front fins 86 and the same length dimension L while the rearmost one of the two rear fins 86 less likely to be subjected to exposure to the splashed pebble stones has the smaller length dimension L than the other of the two rear fins 86. The fins 86 have distances of downward extension from the level of the upper end of the air outlet 82, which are determined according to their length dimensions L. The above-indicated four front fins 86 have the same distance of downward extension from the level of the upper end to the level of the lower end of the air outlet 82.

The inclination angle α, distances d and length dimensions L of the fins 86 are suitably determined so as to minimize the disturbance of the air flow through the air outlet 82 while preventing the entry of the muddy substances and other foreign matters splashed by the rear wheels 14, for example, such that all of straight lines from points in the entire area of the lower surface 32 of the cooler body 24, which are tangent with the outer circumference of the rear wheels 14, extend through any one of the fins 86. In some embodiments, the inclination angle α is within a range between 30° and 60°. In some other embodiments, the inclination angle α is approximately 45°. Further, in some embodiments, the distance d is within a range between 5 mm and 20 mm. In some other embodiments, the distance d is approximately 10 mm. Further, the fins 86 are integrally fixed to inner walls of the air outlet 82 which are opposite to each other in the width direction of the vehicle 12, and are connected to each other by two reinforcing ribs 90 each in the form of a vertical plate, which are located in an intermediate portion of the width of the vehicle 12, and disposed so as to extend in the longitudinal direction of the vehicle 12. It is noted that the fins 86 may take various other forms and arrangements. For example, the fins 86 may be flat plates or sheets, and may be disposed such that the adjacent fins partially overlap each other in the longitudinal direction of the vehicle 12, such that the distance d may have a negative value.

The undercover 28 has a front portion 92 which extends forwardly from the front end of the cooler body 24 to protect the cooler body 24, and downward from the lower end of the air outlet 82 so that the negative air pressure is generated within the air outlet 82, due to the air stream A generated during running of the vehicle 12. The undercover 28 further has a rear portion 94 which extends backward from the rear end of the cooler body 24 back to a position near the rear end of the vehicle 12, like the air inlet 50, to reduce the air resistance within the undercover 28 during running of the vehicle 12. The rear portion 94 has a part which projects upwardly and partially overlaps the cooler body 24 as seen forwardly of the vehicle 12 in the horizontal direction, as seen in the rear end elevational view of FIG. 5. However, the above-indicated part of the rear portion 94 has only a small area of overlap with the cooler body 24, to that the undercover 28 can be moved forwardly relative to the cooler body 24 upon application of a load to the undercover 28, without damaging of the cooler body 24 due to deformation of the above-indicated part.

The undercover 28 constructed as described above has a receptacle hole 100 formed near a boundary between the intermediate portion 80 and the rear portion 94. A resin clip 102 is pre-fixed in the receptacle hole 100. On the other hand, the rear surface 68 of the cooler body 24 has an attaching bracket 104 fixed to a central part of the rear surface 68. The undercover 28 is tentatively assembled with respect to the cooler body 24, with a single action to press the resin clip 102 into a fixing hole formed in the attaching bracket 104. Then, the undercover 28 is positioned with respect to the cooler body 24. It is noted that the attachment bracket 104 is not shown in FIG. 14. The undercover 28 has three other receptacle holes 106 in which resin clips 108 are fixed, and the resin clips 108 are fixed to the rear bumper 52. Like the resin clips 66 described above, the resin clips 102 and 108 are fixed into the respective fixing holes with their elastic deformation such that the resin clips 102 and 108 are not removable from the fixing holes. Thus, the undercover 28 is fixedly attached to the cooler body 24 and the rear bumper 52. The perspective view of FIG. 15 shows the resin clips 102 and 108 fixed in the respective receptacle holes 100 and 106. The resin clip 102 functions as a connector for connecting the undercover 28 to the cooler body 24.

The front portion 92 of the undercover 28 has two fixing holes 110. On the other hand, the front arm portion 42 of the cooler attachment bracket 22 has two cover fixing portions 112, as shown in FIG. 12. These cover fixing portions 112 are also indicated by "x" marks in FIG. 13. Bolts fixed to the lower surfaces of the cover fixing portions 112 are inserted through the fixing holes 110, so that the front portion 92 is fixed to the cooler attachment bracket 22 by the bolts and resin nuts 114 (shown in FIGS. 3 and 12). As shown in FIGS. 3 and 12, the two arm portions 42 provided in the front portion of the cooler attachment bracket 22 extend downward to a level below the cooler body 24, and the front end portions of these arm portions 42 function as the cover fixing portions 112. The bolts fixed to the lower surfaces of the cover fixing portions 112 so as to extend downward are inserted through the fixing holes 110, and the resin nuts 114 are screwed on the bolts.

At the cover fixing portions 112, there is provided a predetermined amount of gap between each of the two arm portions 42 and the undercover 28, as is apparent from FIG. 12. A suitable cushioning member such as a rubber member is inserted in this gap, to permit the undercover 28 to be vertically displaced relative to the arm portions 42, for preventing an upward impact load Fu (indicated in FIG. 2) applied upwardly to the undercover 28 during running of the vehicle 12 on raised or recessed parts of the roadway surface, from being transmitted to the arm portions 42, and for reducing an amount of deformation of the arm portions 42 due to the upward impact load Fu. Further, there is a predetermined spacing distance (gap), such as, without limitation, 15 mm to 25 mm, or in some embodiments, approximately 20 mm, between the undercover 28 and the lower surface 32 of the cooler body 24 when the undercover 28 is attached to the arm portions 42, the cooler body 24 and the rear bumper 52 with the cover fixing portions 112 and the above-described resin dips 102 and 108. The above-described sealing member 88 has a thickness (vertical dimension) of, without limitation, not smaller than 20 mm so that the sealing member 88 fluid-tightly closes a spacing s between the upper open end of the air outlet 82 and the lower surface 32 of the cooler body 24, so that the air discharged from the cooler body 24 can be adequately exhausted downward through the air outlet 82 into the outside atmosphere, while the fresh ambient air is introduced into the cooler body 24 through the air intake duct 26, under the negative air pressure generated within the air outlet 82, whereby the cooling device 10 of the differential pressure air introducing type maintains a high degree of air cooling performance even in the presence of the above-indicated gap and spacing distance s. In addition, elastic deformation of the sealing member 88 reduces an amount of impact load Fu which is applied upwardly to the undercover 28 and which is transmitted to the cooler body 24, and accordingly reduces a degree of damaging of the cooler body 24 due to the impact load Fu.

A strength of attachment (connection) of the undercover 28 to the cooler body 24 with the resin clip 102 is determined such that the undercover 28 is disconnected from the cooler body 24 upon application of the upward impact load Fu to the undercover 28 before damaging of the cooler body 24 connected to the undercover 28 with the resin clip 102, so that the undercover 28 is permitted to be vertically displaced relative to the cooler body 24. The undercover 28 is disconnected from the cooler body 24 due to breakage of the resin clip 102. However, a diameter of the resin clip 102 and a strength of elastic engagement of the resin clip 102 with the cooler body 24 may be determined to permit the vertical displacement of the undercover 28 relative to the cooler body 24 while the resin clip 102 is held in the elastic engagement with the cooler body 24. The resin clip 108 is also configured so as to permit a vertical displacement of the undercover 28 relative to the rear bumper 52 while the resin clip 108 is held in elastic engagement with the rear bumper 52.

The strength of attachment of the undercover 28 to the cooler body 24 with the resin clip 102 is sufficiently lower than a strength of attachment of the cooler body 24 to the cooler attachment bracket 22 with the four fixing bolts 41. Described in detail, upon application of an impact load Fr to the rear portion 94 of the undercover 28 upon collision of the vehicle 12 on the rear side, the resin clip 102 is broken before the cooler body 24 is damaged due to the impact load Fr transmitted to the cooler body 24 through the resin clip 102, so that the undercover 28 is removed from the cooler body 24, and is moved forwardly relative to the cooler body 24, whereby the impact load Fr acting on the cooler body 24 is reduced. Further, a strength of attachment of the undercover 28 to the rear bumper 52 and the cooler attachment bracket 22 with the three resin clips 108 and the two cover fixing portions 112 is sufficiently lower than a strength of attachment of the cooler body 24 to the cooler attachment bracket 22 with the four fixing bolts 41, so that the resin clips 108 and the resin nuts 114 are broken before the cooler body 24 is damaged due to the impact load Fr transmitted to the cooler body 24 through the arm portions 42, and the undercover 28 is removed from the rear bumper 52 and the cooler attachment bracket 22, whereby the impact load Fr acting on the cooler body 24 is reduced. Accordingly, the cooling device 10 permits reduction of damaging of the cooler body 24 and prevention of leakage of the oil upon comparatively light collision of the vehicle 12 with the vehicle following the vehicle 12 or the object located backward of the vehicle 12, without direct collision of the cooler body 24 with the other vehicle or the backward located object.

Figure 16:
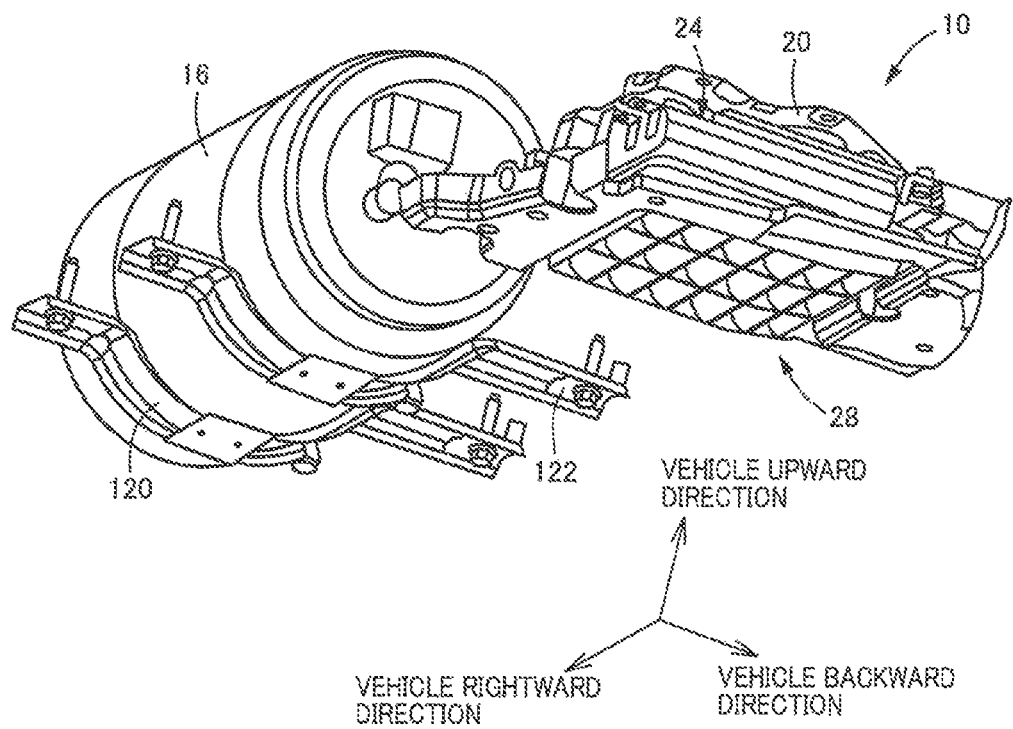
FIG. 16 is a perspective view for explaining a positional relationship between the cooling device and a hydrogen tank located on a left side of the vehicle, as seen forwardly of the vehicle in an obliquely rightward and upward direction.

The hydrogen tank 16 referred to above is also disposed below the floor panel 20 such that the hydrogen tank 16 is fixed to a body member of the vehicle 12 such as the floor panel or a cross member (not shown), through a pair of tank attachment brackets 120 and 122, as shown in FIG. 16. The perspective view of FIG. 16 indicates a positional relationship between the cooling device 10 and the hydrogen tank 16 as seen forwardly of the vehicle 12 in an obliquely rightward and upward direction. The cooling device 10 of FIG. 16 is located on the left side of the vehicle 12. Another cooling device 10 is disposed on the right side of the vehicle 12, such that the two cooling devices 10 are disposed symmetrically with each other on the respective opposite sides of the hydrogen tank 16. These two cooling devices 10 are located near the hydrogen tank 16. In some embodiments, a shortest distance from the cooling devices 10 to the hydrogen tank 16 in the horizontal plane is not larger than 20 cm. Referring to FIG. 16, the hydrogen tank 16 and the cooling device 10 have the shortest spacing distance between the left end of the hydrogen tank 16 and the right end of the cooling device 10 at a front end of the vehicle. In some embodiments, the two cooling devices 10 are positioned such that the lowest point of the undercovers 28 of the cooling devices 10 is, for example, higher by approximately 50 mm than that of the hydrogen tank 16 and the tank attachment brackets 120 and 122, so that the hydrogen tank 16 or the tank attachment bracket 120, 122 comes into collision with the roadway surface during running of the vehicle 12 on raised or recessed parts of the roadway surface, before the undercovers 28 come into collision with the roadway surface. The hydrogen tank 16, which is formed of a metallic material, is a high-strength component having a higher degree of strength with respect to the upward impact load Fu, than the undercovers 28 and the cooler bodies 24, so that a risk of damaging of the undercovers 28 and the cooler bodies 24 due to the collision with the roadway surface is reduced, since the hydrogen tank 16 and the vehicle body such as the floor panel 20 receive the upward impact load Fu.

The vehicle 12 of the present disclosure is configured such that the undercover 28 is disposed below the cooler body 24 into which the ambient air introduced to cool the coolant (oil) is discharged downward from the cooler body 24 through the lower surface 32 of the cooler body 24 into the outside atmosphere, and the undercover 28 protects the cooler body 24 from the foreign matters such as pebble stones and muddy substances splashed from the roadway surface, making it possible to reduce the risk of deterioration of the cooling performance of the cooling device 10 due to damaging and clogging of the cooler body 24. Further, the undercover 28 is attached to the body of the vehicle 12 such that the gap s is provided between the undercover 28 and the lower surface 32 of the cooler body 24, so that the upward impact load Fu applied to the undercover 28 due to collision of the undercover 28 with raised or recessed parts of the roadway surface is received by the vehicle body, and the above-indicated gaps permits a vertical displacement of the undercover 28 relative to the cooler body 24 by a distance corresponding to an amount of the gaps, making it possible to reduce the risk of damaging of the cooler body 24 due to the impact load Fu transmitted thereto, regardless of the relative vertical displacement and deformation of the undercover 28.

In addition, the undercover 28 has the air outlet 82 through which the air discharged downward from the cooler body 24 is exhausted into the outside atmosphere under the negative air pressure generated within the air outlet 82 due to the air stream A generated during running of the vehicle 12. There is interposed the elastically deformable sealing member 88 between the air outlet 82 and the lower surface 32 of the cooler body 24 such that the sealing member 88 fluid-tightly closes the gap s. Thus, the sealing member 88 maintains fluid tightness between the air outlet 82 and the lower surface 32 of the cooler body 24, so that the air discharged from the cooler body 24 is adequately exhausted into the outside atmosphere through the air outlet 82 under the negative air pressure within the air outlet 82 while the fresh ambient air is introduced into the cooler body 24, so that the cooling device 10 of the differential pressure air introducing type has a high degree of cooling performance, even in the presence of the gaps. Further the elastic deformation of the sealing member 88 upon application of the upward impact load Fu to the undercover 28, and the presence of the gap s permit effective reduction of the risk of damaging of the cooler body 24.

The vehicle 12 is further configured such that the cooling device 10 is disposed near the hydrogen tank 16 which has the lower lowest point than the undercover 28. Accordingly, the hydrogen tank 16 is more likely to come into collision with raised or recessed parts of the roadway surface, before the undercover 28 comes into collision with the raised or recessed parts. Thus, the undercover 28 has a reduced risk of collision with the roadway surface, permitting further reduction of a risk of damaging of the cooler body 24 due to collision of the undercover 28 with the roadway surface. In this respect, it is noted that the vehicle 12, which is an electric vehicle of a fuel-cell type, is provided with the hydrogen tank 16, which can be utilized as the high-strength component, without considerable design changes of the vehicle 12, for easily reducing the risk of damaging of the cooler body 24 due to the upward impact load Fu.

The vehicle 12 is also configured such that the undercover 28 is connected to the cooler body 24 with the connector in the form of the resin clip 102. Accordingly, the undercover 28 and the cooler body 24 can be held in position relative to each other, even in the presence of the above-indicated gaps therebetween, so that adequate fluid tightness between the air exhaust passage in the form of the air outlet 82 and the lower surface 32 of the cooler body 24 can be maintained by the sealing member 88, whereby the cooling device 10 of the differential pressure air introducing type has a high degree of cooling performance, and is easily assembled. Further, the connection strength of the resin clip 102 is determined such that the undercover 28 is disconnected from the cooler body 24, before damaging of the cooler body 24 due to connection of the undercover 28 to the cooler body 24 through the resin clip 102, upon application of the upward impact load Fu to the undercover 28. Accordingly, there is not a risk of damaging of the cooler body 24 due to the connection of the undercover 28 to the cooler body 24.

The vehicle 12 is further configured such that the cooler body 24 has the flat box outer configuration having the upper and lower surfaces 30 and 32 which are located below the floor panel 20 of the vehicle 12 and are substantially parallel to the horizontal plane and each of which has the large area, so that the ambient air is introduced into the cooler body 24 through the upper surface 30 of the cooler body 24, and is discharged from the cooler body 24 through the lower surface 32 of the cooler body 24. Accordingly, the cooler body 24 can be disposed compactly in a small space below the floor panel 20, and the ambient air for cooling the coolant can efficiently flow into the cooler body 24 through the upper surface 30 and from the cooler body 24 through the lower surface 32, whereby the coating device 10 has a high degree of air cooling performance.

The vehicle 12 is also configured such that the air exhaust passage in the form of the air outlet 82 is formed so as to extend through the undercover 28 in the vertical direction such that the ambient air discharged from the cooler body 24 through the lower surface 32 of the cooler body 24 is exhausted through the air outlet 82 downward from the cooler body 24. Accordingly, the undercover 28 having the air exhaust passage in the form of the air outlet 82 has a simpler, more compact and less costly structure than in the case where the air exhaust passage is open sideways of the vehicle 12. Further, the undercover 28 is provided with the plurality of fins 86 disposed within the air outlet 82 such that the fins 86 are spaced apart from each other in the longitudinal direction of the vehicle 12. Each of the fins 86 extends in the width direction of the vehicle 12 and is inclined such that the lower end of the fin 86 is located backward of the upper end of the fin in the longitudinal direction of the vehicle 12. By suitably determining the length dimensions L, inclination angles α and spacing distances d of the fins 86, the ambient air discharged from the cooler body 24 through the lower surface 32 of the cooler body 24 can be adequately exhausted into the outside atmosphere along the plurality of fins 86, and the cooler body 24 can be adequately protected by the fins 86 from muddy substances and other foreign matters splashed from the roadway surface.

The vehicle 12 is further configured such that the cooling device 10 further comprises the air intake duct 26 which is disposed on the cooler body 24 in fluid-tight contact with the upper surface 30 of the cooler body 24 and which has the air inlet 50 formed in the end portion of the air intake duct 26, so that the fresh ambient air is introduced through the air inlet 50 into the air intake duct 26 and introduced from the air intake duct 26 into the cooler body 24 through the upper surface 30 when the ambient air discharged from the cooler body 24 is exhausted through the air outlet 82 into the outside atmosphere under the negative air pressure generated at the lower open end of the air outlet 82. Accordingly, the ambient air smoothly flows through the cooler body 24 to efficiently cool the coolant, such that the ambient air introduced into the cooler body 24 through the upper surface 30 flows downward through the cooler body 24, and is discharged from the cooler body 24 through the lower surface 32. In this respect, it is particularly noted that the cooler body 24 having the flat box outer configuration has the comparatively large upper surface 30 through which the ambient air is introduced into the cooler body 24 and the comparatively large lower surface 32 through which the ambient air is discharged from the cooler body 24, so that the cooling performance of the cooling device 10 is further improved. Further, the cooling device 10 including the air intake duct 26 and the undercover 28 can be compactly disposed in a space below the floor panel 20 of the vehicle 12.

Although embodiments of the present disclosure have been described in detail by reference to the drawings, for illustrative purpose only, it is to be understood that the present disclosure may be otherwise embodied.

In some embodiments, the undercover 28 is connected to the cooler body 24 with the single resin clip 102. However, the undercover 28 may be connected to the cooler body 24 with a plurality of resin clips. Further, connectors such as positioning pins and holes other than the resin clip 102 may be used for positioning the undercover 28 with respect to the cooler both 24 in the horizontal direction. The undercover 28 need not be connected to the cooler body 24 with the connector such as the resin clip 102.

While the undercover 28 in, some embodiments, has the air exhaust passage in the form of the air outlet 82 formed right under the cooler body 24, the air exhaust passage may be formed so as to be open to the outside atmosphere, at a position horizontally distant from a position right under the cooler body 24. In this case, the air outlet 82 which is open downward of the cooler body 24 to the outside air is not formed, and the undercover 28 is not provided with the fins 86.

In some embodiments, the air intake duct 26 is fixed to the cooler body 24 with the pair of engaging jaws 64 and the pair of resin clips 66. The number and positions of these engaging jaws 64 and resin clips 66 may be suitably changed. Further, the engaging jaws 64 may be replaced by additional resin clips, so that the air intake duct 26 is fixed to the cooler body 24 with only the resin clips including the resin clips 66. Furthermore, the air intake duct 26 may be fixed more tightly to the cooler body 24 with metallic bolts, for example, and may be fixed otherwise, for instance, fixed to a body member of the vehicle 12, such as the floor panel 20 and the rear bumper 52, as well to the cooler body 24. The air intake duct 26 need not be provided. For example, the ambient air is introduced into the cooler body 24 directly through the upper surface 30.

While embodiments of the present disclosure and modifications of the embodiments have been described in detail, it is to be understood that the present disclosure may be embodied with various other modifications and improvements, which may be apparent to those skilled in the art.

What is claimed is:

1. A vehicle comprising rear wheels, and a heat exchanging type cooling device through which a coolant flows and which includes a cooler body disposed in a rear portion of the vehicle and attached to a body of the vehicle, wherein an ambient air introduced into the cooler body to cool the coolant with heat exchanging between the coolant and the ambient air flows through the cooler body and is discharged downward through a lower surface of the cooler body, the cooling device comprising:
  an undercover disposed below the cooler body and having an air exhaust passage into which the ambient air discharged through the lower surface of the cooler body is introduced and through which the ambient air is exhausted into outside atmosphere, under a negative air pressure generated due to an air stream generated during running of the vehicle; and
  an elastically deformable sealing member in a closed form interposed between the air exhaust passage and the lower surface of the cooler body, and
  wherein the undercover is attached to the body of the vehicle, such that a gap is provided between the undercover and the lower surface of the cooler body, and such that the sealing member fluid-tightly closes the gap.

2. The vehicle according to claim 1, further comprising:
  a high-strength component which is fixed to the body of the vehicle and which is disposed near the cooler body and the undercover, and
  wherein the high-strength component has a higher degree of strength with respect to an upward impact load than the cooler body and the undercover, and has a lower lowest point than the undercover.

3. The vehicle according to claim 1, wherein the undercover is connected to the cooler body with a connector, a connection strength of which is determined such that the undercover is disconnected from the cooler body, before damaging of the cooler body due to connection of the undercover to the cooler body through the connector, upon application of an upward impact load to the undercover.

4. The vehicle according to claim 1, wherein the cooler body has a flat box outer configuration having upper and lower surfaces which are located below a floor panel of the vehicle and are substantially parallel to a horizontal direction and each of which has a large area, and wherein the ambient air is introduced into the cooler body through its upper surface, and is discharged from the cooler body through its lower surface.

5. The vehicle according to claim 1, wherein the air exhaust passage is an air outlet formed so as to extend through the undercover in a vertical direction such that the ambient air is exhausted through the air outlet downward from the cooler body, and the undercover is provided with a plurality of fins disposed within the air outlet such that the plurality of fins are spaced apart from each other in a longitudinal direction of the vehicle, each of the plurality of fins extending in a width direction of the vehicle and being inclined such that a lower end of the fin is located backward of its upper end in the longitudinal direction of the vehicle.

6. The vehicle according to claim 1, wherein the cooling device further comprises an air intake duct which is disposed on the cooler body in fluid-tight contact with an upper surface of the cooler body and which has an air inlet formed in an end portion of the air intake duct, so that fresh ambient air is introduced through the air inlet into the air intake duct and introduced from the air intake duct into the cooler body through its upper surface when the ambient air discharged from the cooler body is exhausted through the air exhaust passage into the outside atmosphere under the negative air pressure generated at a lower open end of the air exhaust passage.

* * * * *

UNITED STATES PATENT AND TRADEMARK OFFICE
CERTIFICATE OF CORRECTION

PATENT NO. : 10,793,206 B2
APPLICATION NO. : 16/264002
DATED : October 6, 2020
INVENTOR(S) : Koichi Nakamura, Tomoaki Furukawa and Kiyonori Takagi Page 1 of 1

It is certified that error appears in the above-identified patent and that said Letters Patent is hereby corrected as shown below:

On the Title Page

Item (72), inventor 1, city, delete "Miyoshi" and insert --Miyoshi-shi Aichi--, therefor.

Item (72), inventor 2, city, delete "Toyota" and insert --Toyota-shi Aichi--, therefor.

Item (72), inventor 3, city, delete "Okazaki" and insert --Okazaki-shi Aichi--, therefor.

In the Specification

In Column 3, Line(s) 7, delete "front" and insert --from--, therefor.

In Column 3, Line(s) 22, after "within", delete ",".

In Column 6, Line(s) 6, delete "FIG. 6:" and insert --FIG. 6;--, therefor.

In Column 6, Line(s) 8, delete "FIG. 6:" and insert --FIG. 6;--, therefor.

In Column 10, Line(s) 5, delete "devotional" and insert --elevational--, therefor.

In Column 11, Line(s) 52, after "limitation", delete "." and insert --,--, therefor.

In Column 11, Line(s) 56, after "packing", delete ",".

In Column 18, Line(s) 38, delete "gaps" and insert --gap s--, therefor.

In Column 18, Line(s) 66, delete "coating" and insert --cooling--, therefor.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*